US010951929B2

(12) United States Patent
Allen

(10) Patent No.: US 10,951,929 B2
(45) Date of Patent: Mar. 16, 2021

(54) EXECUTION OF CASES BASED ON BARCODES IN VIDEO FEEDS

(71) Applicant: Bruce Allen, Stillwater, MN (US)

(72) Inventor: Bruce Allen, Stillwater, MN (US)

(73) Assignee: BEGASP LLC, Stillwater, MN (US)

( * ) Notice: Subject to any disclaimer, the term of this patent is extended or adjusted under 35 U.S.C. 154(b) by 75 days.

(21) Appl. No.: 16/422,990

(22) Filed: May 25, 2019

(65) Prior Publication Data

US 2020/0059679 A1 Feb. 20, 2020

Related U.S. Application Data

(60) Division of application No. 16/170,224, filed on Oct. 25, 2018, now Pat. No. 10,448,064, which is a continuation of application No. 16/104,734, filed on Aug. 17, 2018, now Pat. No. 10,237,583.

(51) Int. Cl.
| | | |
|---|---|---|
| *G06K 19/00* | (2006.01) | |
| *H04N 21/234* | (2011.01) | |
| *G06K 7/14* | (2006.01) | |
| *G06F 16/955* | (2019.01) | |
| *H04N 21/81* | (2011.01) | |
| *H04N 21/6543* | (2011.01) | |
| *H04N 21/44* | (2011.01) | |

(52) U.S. Cl.
CPC ... *H04N 21/23418* (2013.01); *G06F 16/9554* (2019.01); *G06K 7/1417* (2013.01); *H04N 21/44008* (2013.01); *H04N 21/6543* (2013.01); *H04N 21/8146* (2013.01)

(58) Field of Classification Search
CPC ......... H04N 21/23418; H04N 21/6543; H04N 21/8146; G06F 16/9554; G06K 7/1417
See application file for complete search history.

(56) References Cited

FOREIGN PATENT DOCUMENTS

WO WO-2018208293 A1 * 11/2018 ........... H04B 10/116

* cited by examiner

*Primary Examiner* — Matthew Mikels
(74) *Attorney, Agent, or Firm* — Georgiy L. Khayet

(57) ABSTRACT

Systems and methods for executing a case based on a barcode detected in a video feed are described herein. An example method commences with receiving the video feed from a video content provider. The video feed may be provided by a client. The method may continue with extracting at least one video frame from the video feed. The method may further include detecting a barcode embedded in the at least one video frame and analyzing the barcode to determine a category associated with the at least one video frame. The method may continue with ascertaining an execution case associated with the category. The method may further include selectively executing the execution case.

9 Claims, 6 Drawing Sheets

EXECUTION OF CASES BASED ON BARCODES IN VIDEO FEEDS

CROSS-REFERENCE TO RELATED APPLICATIONS

This application is a divisional application of U.S. application Ser. No. 16/170,224, entitled "EXECUTION OF CASES BASED ON BARCODES IN VIDEO FEEDS", filed on Oct. 25, 2018, which is a Continuation of U.S. patent application Ser. No. 16/104,734, entitled "EXECUTION OF CASES BASED ON BARCODES IN VIDEO FEEDS", filed on Aug. 17, 2018. The subject matter of the aforementioned application is incorporated herein by reference for all purposes.

TECHNICAL FIELD

The present disclosure relates generally to data processing and, more particularly, to execution of cases based on barcodes detected in a video feed.

BACKGROUND

The use of online video services is rapidly expanding. Many online platforms offer services related to video streaming, such as live video game streaming, sports streaming, music event streaming, video on demand, and so forth. Both individual users and companies provide media content to online platforms to stream the media content to a plurality of users. When the online platform streams the media content provided by users, the actions performed by users with regard to the media content streamed are limited. Conventionally, if users want to perform some actions with regard to the media content being streamed, the users need to use additional software or online services. For example, it may be difficult for a user to insert an image into the media content on the fly when the media content is streamed by an online platform.

Additionally, the user may want certain actions to be done automatically when metrics associated with the media content that is streamed by the online platform reach a predetermined value. Such actions may include, for example, providing a payment to the user for advertisements shown in the media content when the number of viewers exceeds a predetermined value. However, conventional platforms may be unable to capture commands that are embedded into the media content or may be not able to immediately react to changing metrics of the media content by performing certain actions with regard to media content, a single user, or multiple users.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are computer-implemented systems and methods for executing a case based on a barcode detected in a video feed. In some example embodiments, a system for executing a case based on a barcode detected in a video feed may include a processor and a database communicatively coupled to the processor and storing instructions executable by the processor. The processor may be configured to receive the video feed from a video content provider. The video feed may be provided by a client. The processor may be further configured to extract at least one video frame from the video feed. The processor may be configured to detect a barcode embedded in the at least one video frame. The processor may be further configured to analyze the barcode to determine a category associated with the at least one video frame. The processor may be configured to ascertain an execution case associated with the category and selectively execute the execution case.

In some example embodiments, a method for executing a case based on a barcode detected in a video feed may commence with receiving the video feed from a video content provider. The video feed may be provided by a client. The method may continue with extracting at least one video frame from the video feed. The method may further include detecting a barcode embedded in the at least one video frame and analyzing the barcode to determine a category associated with the at least one video frame. The method may continue with ascertaining an execution case associated with the category. The method may further include selectively executing the execution case.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and, in which.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The present disclosure provides methods and systems for executing a case based on a barcode detected in a video feed. A client may want a video feed to be streamed by a video content provider. The client may embed specific data into the video feed using video processing means. For example, the client may embed a barcode containing specific data in one or more frames of the video feed. The barcode may encode data related to an action the client wants performed when the video feed is streamed by the video content provider. The client may store data associated with the barcode in a database and provide the video feed with the embedded barcode to the video content provider. The video feed may include a live video provided by the user to the video content provider in real time.

Furthermore, the client may send a signal to a system for executing a case based on a barcode detected in a video feed. The signal may contain a reference to a video consumption site associated with the video content provider. Based on the receipt of the reference, the system may trigger receiving the video feed from the video content provider by accessing the video consumption site associated with the video content provider. The system may extract video frames from the video feed and detect the barcode embedded in the video frames. The system may analyze the barcode to determine a category encoded in the barcode. Specifically, the system may access the database to determine which category is associated with the barcode. Upon determination of the category, the system may use the database to look up an execution case associated with the category. The execution case may include an action the client wants to be done by the system based on the video feed. The execution case may include collecting data associated with the video feed, transforming a video, verifying video contents, creating an alternate video format, verifying an activity associated with the video feed, distributing a video, describing video feed metadata, initiating recording of the video feed, combining several video feeds into a single video feed, and so forth. When the execution case is determined, the system may execute the execution case.

Figure 1:
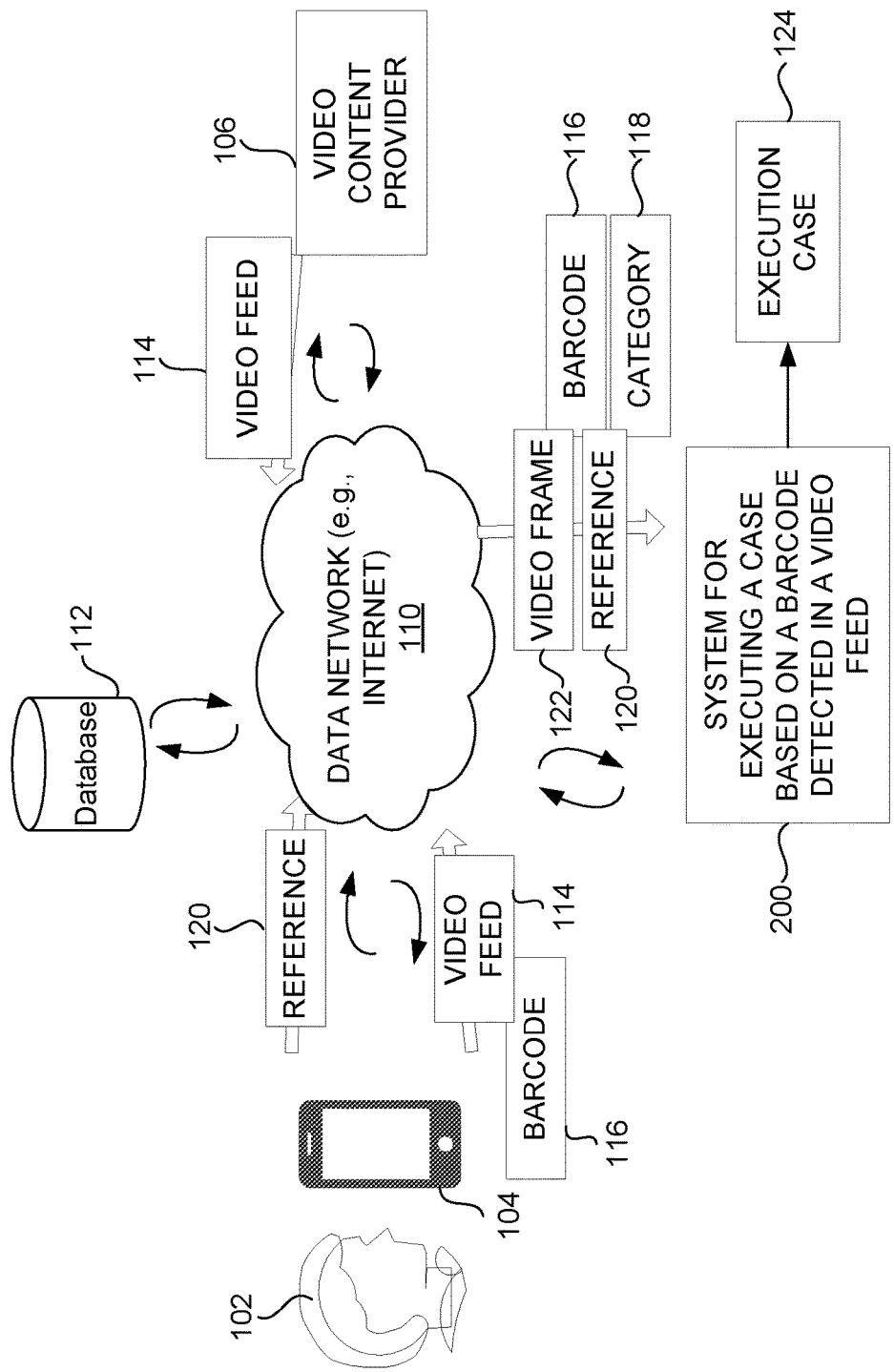
FIG. 1 illustrates an environment within which systems and methods for executing a case based on a barcode detected in a video feed can be implemented, in accordance with some embodiments.

FIG. 1 illustrates an environment 100 within which systems and methods for executing a case based on a barcode detected in a video feed can be implemented, in accordance with some embodiments. The environment 100 may include a user 102, a client device 104 also referred to as a client, a system 200 for executing a case based on a barcode detected in a video feed (also referred to as a system 200), a video content provider 106, a data network 110 (e.g., the Internet or a computing cloud), and a database 112. The client device 104, the system 200, and the video content provider 106 may be connected via the data network 110.

The user 102 may be associated with the client device 104. The client device 104 may include a personal computer (PC), a laptop, a smartphone, a tablet PC, a television set, a smartphone, an Internet phone, a netbook, a network appliance, and so forth. In an example embodiment, the user 102 may include a mobile client, a desktop client, a web service, and so forth. In an example embodiment, the user 102 may include an online video game player, an online sport event viewer, an online music event viewer, and the like.

The data network 110 may include a computing cloud, the Internet, or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

The user 102 may provide a video feed 114 to the video content provider 106. The user 102 may use the client device 104 to embed a barcode 116 in the video feed 112. The barcode 116 may encode a category 118. The user 102 may store data related to a plurality of barcodes and categories associated with the plurality of barcodes in the database 112. The user 102 may also send, via the client device 104, a reference 120 to the system 200. The reference 120 may include a reference to a video consumption site associated with the video content provider 106.

The video content provider 106 may receive the video feed 114 from the client device 104. In an example embodiment, the video content provider 106 may stream the video feed 114. The system 200 may access the video consumption site associated with the video content provider 106 based on the reference 120 received from the client device 104. The system 200 may capture one or more video frames 122 of the video feed 114 and detect the barcode 116 embedded in the video frames 122. In an example embodiment, the system 200 may have one or more of a barcode detection software, a computer vision means intended for reading barcodes in video frames, or other means for detecting and reading barcodes.

The system 200 may access the database 112 to determine the category associated with the barcode 116. Based on the determined category 118, the system 200 may ascertain an execution case 124 associated with the category. In an example embodiment, the execution case 124 may include actions required to be performed by the system 200 (for example, transforming a video associated with the video feed, distributing the video, verifying video contents, creating an alternate video format, and so forth).

Figure 2:
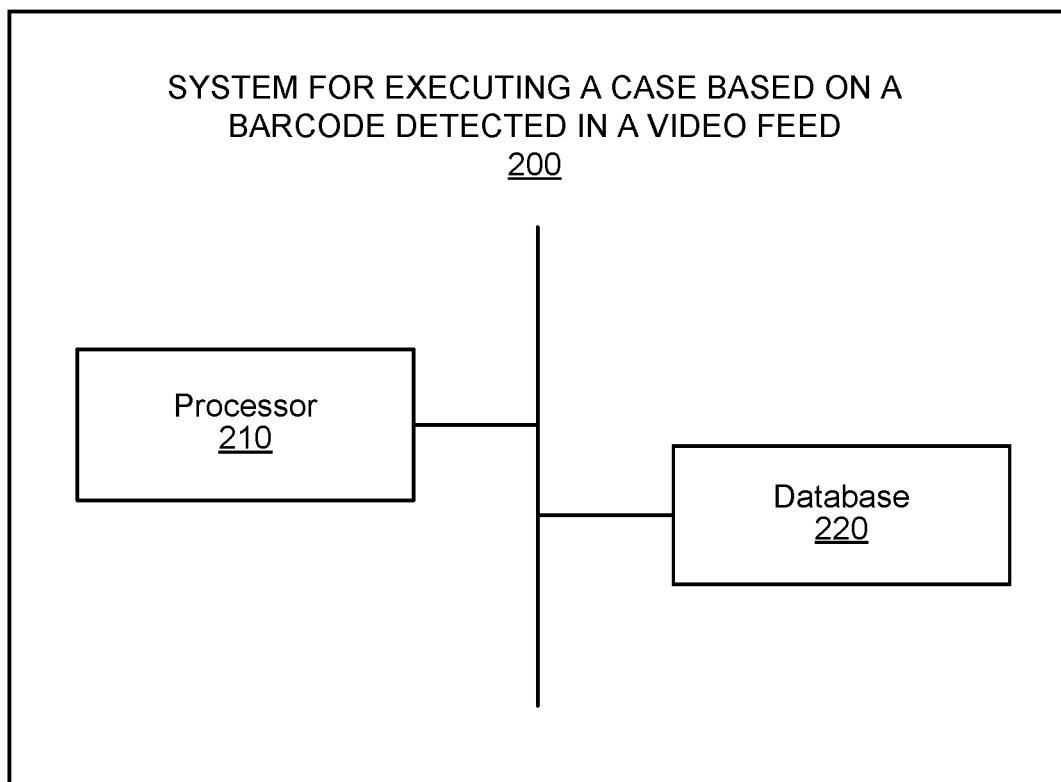
FIG. 2 is a block diagram showing various modules of a system for executing a case based on a barcode detected in a video feed, in accordance with certain embodiments.

FIG. 2 is a block diagram showing various modules of a system 200 for executing a case based on a barcode detected in a video feed, in accordance with certain embodiments. The system 200 may include a processor 210 and a database 220. The database 220 may include computer-readable instructions for execution by the processor 210. The processor 210 may include a programmable processor, such as a microcontroller, central processing unit (CPU), and so forth. In other embodiments, the processor 210 may include an application-specific integrated circuit or programmable logic array, such as a field programmable gate array, designed to implement the functions performed by the system 200. In various embodiments, the system 200 may be installed on a client device or may be provided as a cloud service residing in a cloud storage.

The processor 210 may be configured to receive, from a client, a reference to a video consumption site associated with the video content provider. In an example embodiment, the client may include at least one of the following: a mobile client, a desktop client, a web service, and so forth. The video content provider may be a livestream provider that may reproduce, i.e., stream, a video feed provided to the video content provider by the client.

The processor 210 may be operable to receive the video feed from the video content provider. In an example embodiment, the processor 210 may access a video consumption site on which the video feed may be provided by the video content provider. The processor 210 may receive the video feed by capturing video frames of the video feed. In other words, the processor 210 may be operable to extract at least one video frame from the video feed and detect a barcode embedded in the at least one video frame. In an example embodiment, the barcode may include a Quick Response (QR) code.

The processor 210 may be operable to analyze the barcode to determine a category associated with the at least one video frame. The determination of the category may include extracting an identifier from the barcode and looking up the category in the database 220 based on the identifier. In an example embodiment, the category may include a blockchain category.

The processor 210 may be operable to ascertain an execution case associated with the category. The processor 210 may be further operable to selectively execute the execution case. In an example embodiment, the execution case may include one or more of the following actions: transforming a video, distributing a video, verifying video contents, executing a smart contract, creating an alternate video format, verifying a contract right, verifying an activity, describing video feed metadata, generating a record, initiating a recording, displaying an image, injecting an image into the video feed, displaying an advertisement, rotating an advertisement banner, calculating an advertisement revenue, performing a special effect, collecting data associated with the video feed, removing the barcode from the at least one video frame, and so forth. The transformation of the video may include cutting, combining two or more videos, highlighting portions of the video, creating alternate video formats, and so forth. The verification of the video contents may include verifying rights associated with the video, checking activity associated with the video, checking policies to be applied to the video, and so forth.

The processor 210 may need some time to capture the video feed and determine the category based on the barcode. Therefore, there may be an offset between a real-time video feed streamed by the video content provider and the determination of the category by the processor 210 based on the captured video feed. To ensure that the processor 210 executes the execution case that relates to the video feed shown in a current moment of time, the client may send the intended category to the processor 210. The intended category may be associated with the execution case to be performed by the processor 210. Therefore, in an example embodiment, the processor 210 may be optionally configured to receive, from the client, an intended category associated with the at least one video frame. The client may send the intended category when the client wants to execute specific execution cases based on the intended category. Providing of the intended category by the client may be optional and may not be necessary in all embodiments. For example, the intended category may be necessary, e.g., in payment workflows or when a callback is needed to execute a smart contract. Smart contracts may include computer programs that facilitate performance of contracts in blockchain technology.

The processor 210 may compare the intended category to the category determined based on the barcode. Based on the determination that the intended category does not match the category determined based on the barcode, the processor 210 may discard the category determined based on the barcode. Furthermore, the processor 210 may send a notification to the client informing about the mismatch.

In case of the determination that the intended category matches the category determined based on the barcode, the processor may execute a smart contract. In an example embodiment, the processor 210 may record a web Uniform Resource Locator (URL) of a web site where the video feed is streamed into metadata associated with the smart contract.

In an example embodiment, the processor 210 may be further configured to determine that the barcode includes a group Identification (ID). Specifically, the processor 210 may read the barcode to determine an identifier encoded in the barcode. The processor 210 may look through records in the database 220, find a record storing the identifier, and determine that the identifier is the group ID.

Based on the determination, the processor 210 may execute the execution case with respect to at least one further video feed associated with the group ID. The execution of the execution case may include aggregating the video feed with at least one further video feed associated with the group ID. In a further example embodiment, the execution of the execution case may include determining a number of viewers for the video feed based on the group ID associated with the client. The number of viewers may be determined by querying an application programming interface (API) associated with the video content provider by the processor 210. The processor 210 may check existing records in the database associated with the client and determine a group ID for the smart contract that the client has not been paid for.

The processor 210 may determine that the number of viewers exceeds a predetermined payout threshold. Additionally, the processor 210 may count the number of views by the viewers. Based on the determination and the count, the processor 210 may determine the execution case. The execution case may include executing a smart payment contract. In an example embodiment, the smart payment contract may include an escrow contract that may include a payment for the number of views. The escrow contract may be associated with a blockchain payment.

The processor 210 may update the database 220 by updating records related to the group ID and execution of the smart payment contract with regard to the client.

In case of a live video, the execution case may include determining metadata associated with the live video, such as number of viewers, feedback received from the viewers (likes, new followers, new subscription in a social network or a web site), and so forth. In an example embodiment, the processor 210 may create a record in the database 220 and store the association between the group ID and the corresponding execution case to the record.

Figure 3:
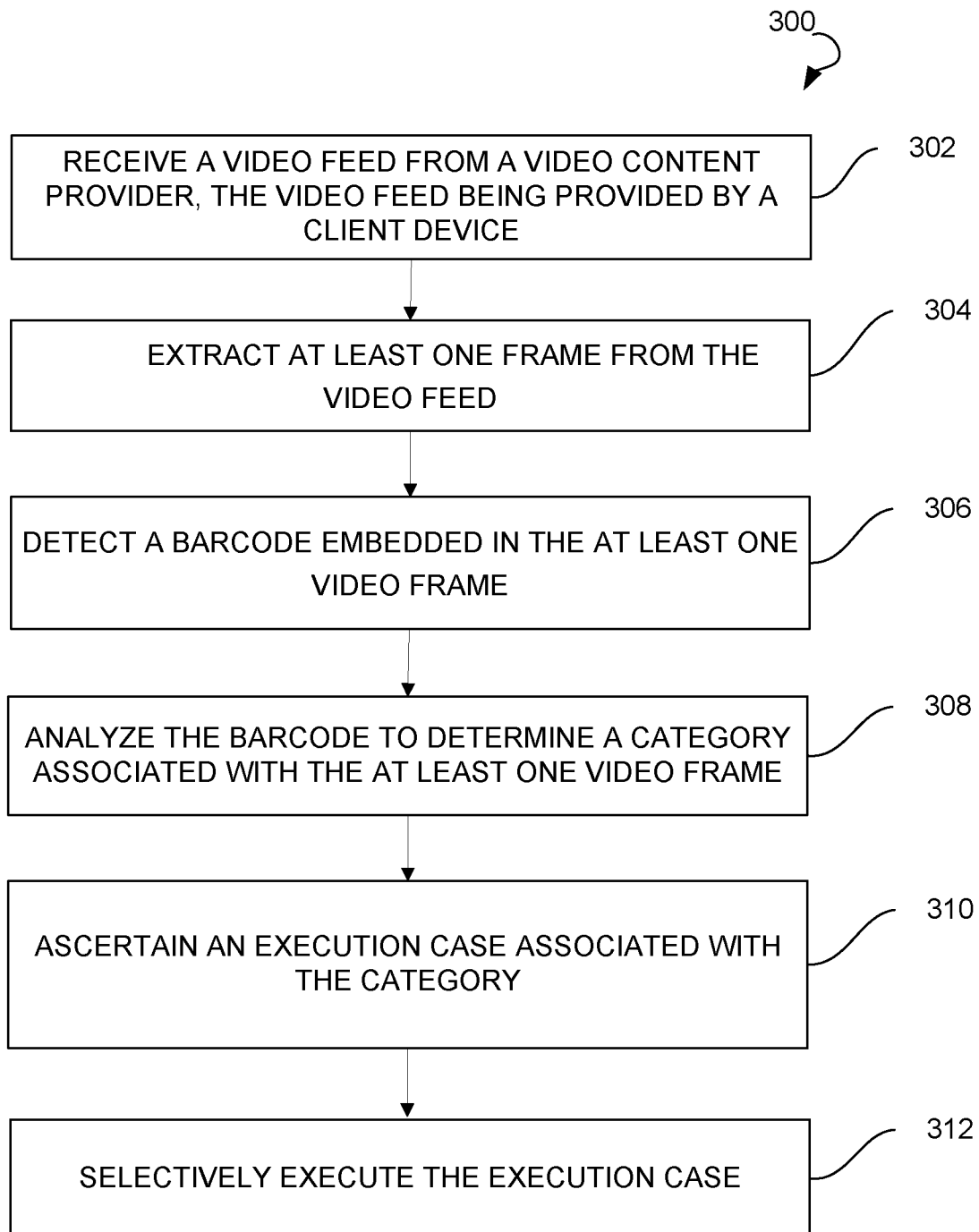
FIG. 3 is a flow chart illustrating a method for executing a case based on a barcode detected in a video feed, in accordance with an example embodiment.

FIG. 3 is a flow chart illustrating a method 300 for executing a case based on a barcode detected in a video feed, in accordance with an example embodiment. In some embodiments, the operations may be combined, performed in parallel, or performed in a different order. The method 300 may also include additional or fewer operations than those illustrated. The method 300 may be performed by processing logic that may comprise hardware (e.g., decision making logic, dedicated logic, programmable logic, and microcode), software (such as software run on a general-purpose computer system or a dedicated machine), or a combination of both.

The method 300 may optionally include receiving, from a client, a reference to a video consumption site associated with a video content provider. The reference may include a web URL. The client may include at least one of the following: a mobile client, a desktop client, a web service, and the like. In an example embodiment, the video content provider may include a livestream provider or a provider that stores the video provided by the client. The method 300 may continue with receiving, by a processor, the video feed from the video content provider at operation 302. The video feed may be accessed using the reference to a video consumption site. The video feed may be provided to the video content provider by the client.

The method 300 may further include extracting at least one video frame from the video feed at operation 304. The method 300 may continue with detecting a barcode embedded in the at least one video frame at operation 306. In an example embodiment, the barcode may include a QR code. The method 300 may further include analyzing the barcode to determine a category associated with the at least one video frame at operation 308. The category may be determined by extracting an identifier from the barcode and looking up the category in a database based on the identifier.

The method 300 may continue with operation 310, at which an execution case associated with the category may be ascertained. The method 300 may further include selectively executing the execution case at operation 312.

In an example embodiment, the method 300 may further include determining that the barcode includes a group ID. If it is determined that the barcode includes the group ID, the execution case may be executed with respect to at least one further video feed associated with the group ID. The execution case may be executed by aggregating the video feed with at least one further video feed associated with the group ID.

In an example embodiment, the method 300 may further include determining a number of viewers of the video feed based on the group ID and by using an API associated with the video content provider. Based on the determination that the number of viewers exceeds a predetermined payout threshold, a smart payment contract may be executed.

Figure 4:
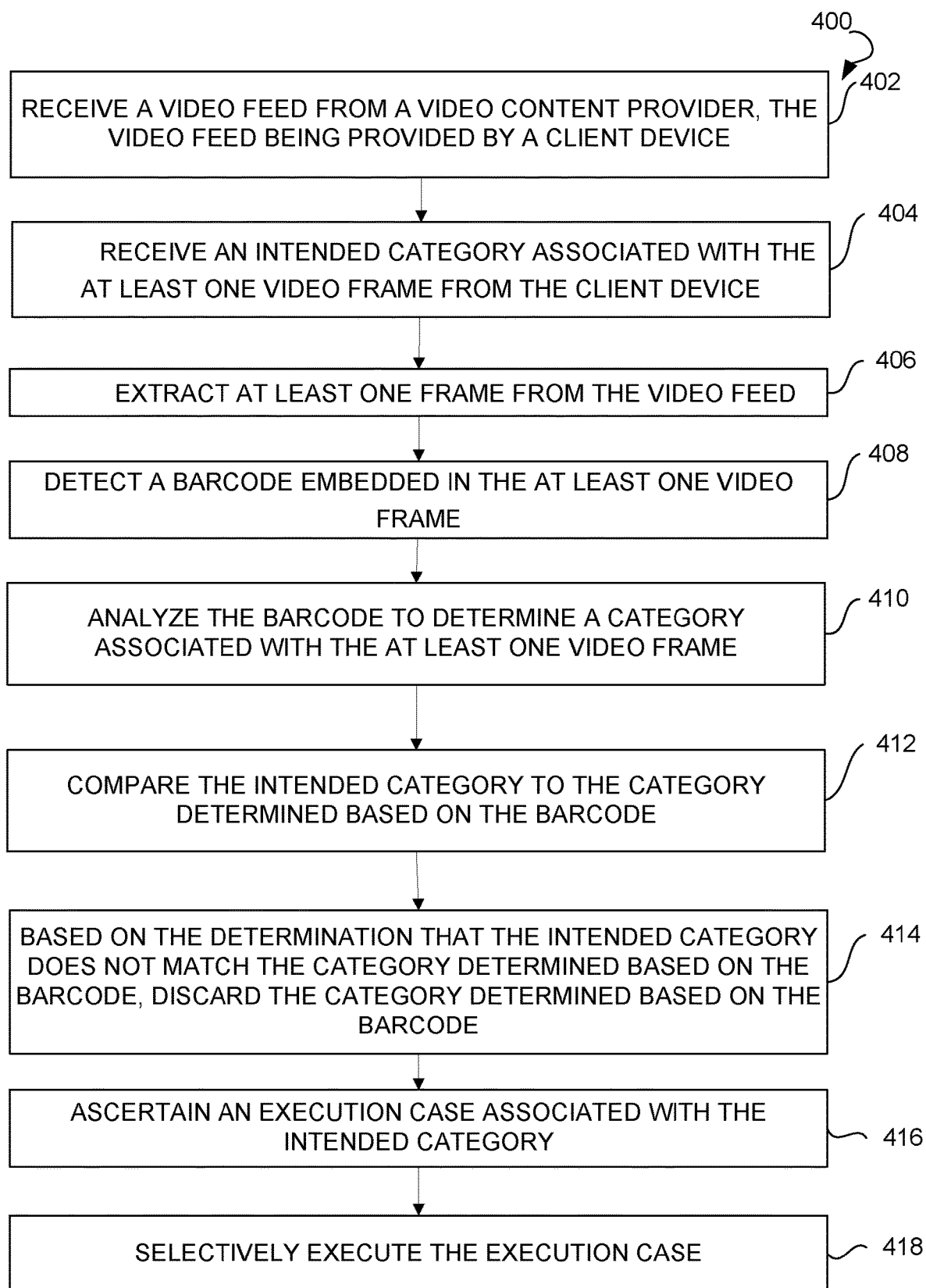
FIG. 4 is a flowchart illustrating a method for executing a case based on a barcode detected in a video feed, in accordance with an example embodiment.

FIG. 4 is a flow chart illustrating a method 400 for executing a case based on a barcode detected in a video feed, in accordance with another example embodiment. In some embodiments, the operations may be combined, performed in parallel, or performed in a different order. The method 400 may also include additional or fewer operations than those illustrated. The method 400 may be performed by processing logic that may comprise hardware (e.g., decision making logic, dedicated logic, programmable logic, and microcode), software (such as software run on a general-purpose computer system or a dedicated machine), or a combination of both.

The method 400 may commence with receiving, by a processor, the video feed from a video content provider at operation 402. The video feed may be provided by a client. In an example embodiment, the client may send a reference to the processor informing that the execution case associated with the video feeds need to be executed. The reference may comprise no indication to the web location of the video content provider. The method 400 may include determining an endpoint associated with the video content provider based on data associated with the client and stored in the database or client instructions preliminarily stored in the database.

The method 400 may further include receiving, from the client, an intended category associated with the at least one video frame at operation 404. The method 400 may include extracting at least one video frame from the video feed at operation 406. The method 400 may continue with detecting a barcode embedded in the at least one video frame at operation 408. The method 400 may further include analyzing the barcode to determine a category associated with the at least one video frame at operation 410. The category may be determined by extracting an identifier from the barcode and looking up the category in a database based on the identifier.

The method 400 may continue with operation 412, at which the intended category may be compared to the category determined based on the barcode. At operation 414, based on the determination that the intended category does not match the category determined based on the barcode, the category determined based on the barcode may be discarded. The method 400 may further ascertain an execution case associated with the category at operation 416. The method 400 may continue with selectively executing the execution case at operation 418.

In an example embodiment, the method 400 may further include determining that the intended category matches the category determined based on the barcode. Based on the determination, a smart contract may be executed.

Figure 5:
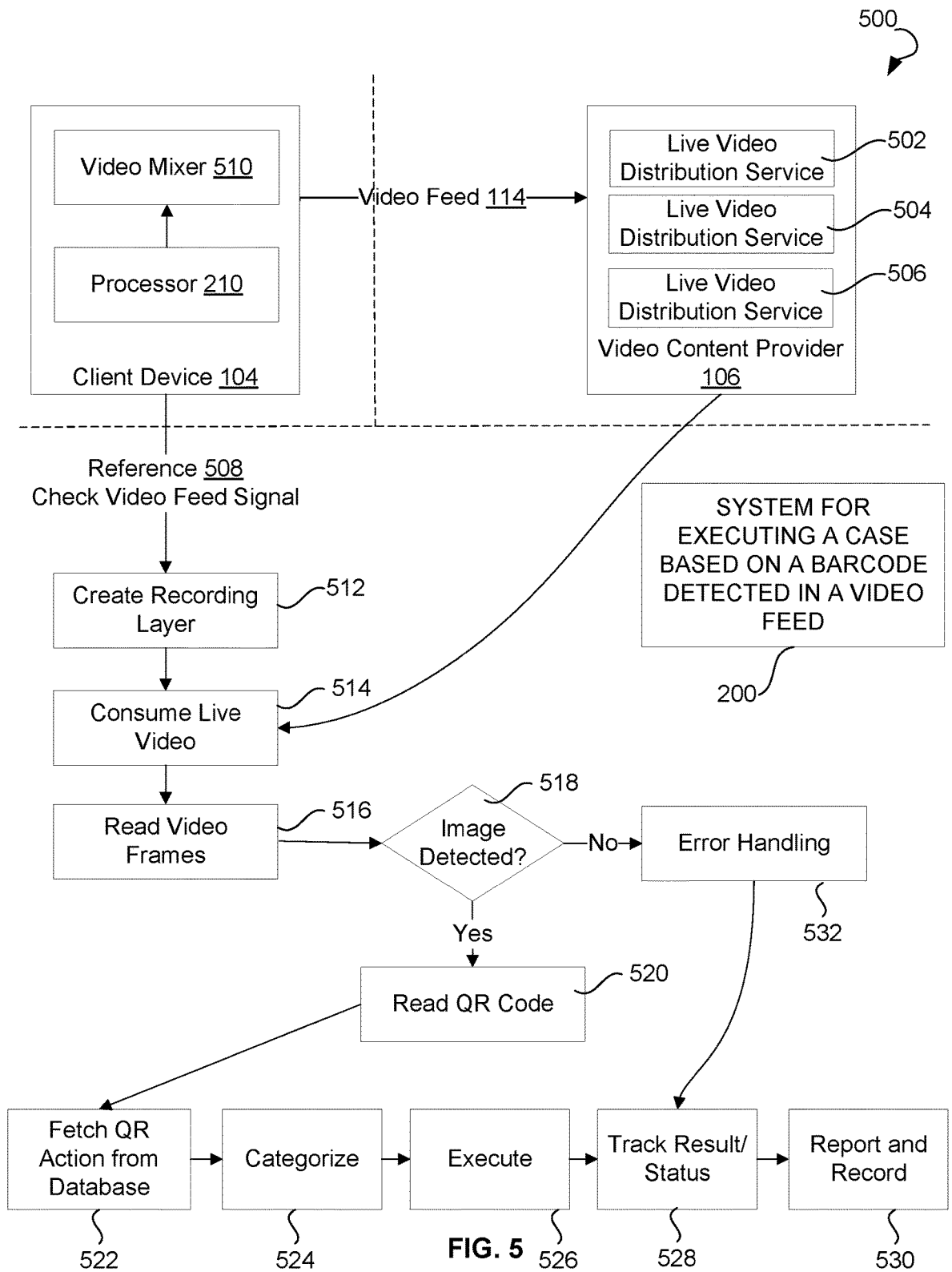
FIG. 5 is a schematic diagram illustrating a method for executing a case based on a barcode detected in a video feed, in accordance with an example embodiment.

FIG. 5 is a schematic diagram illustrating a method 500 for executing a case based on a barcode detected in a video feed, according to an example embodiment. A client device 104 may communicate with a video content provider 106 and a system 200 for executing a case based on a barcode detected in a video feed.

The client device 104 may have a processor 210 and a video mixer 510. The video mixer 510 may be configured to embed an image into a video feed. The image may include a barcode, such as a QR code. The client device 104 may be configured to manage the location of the barcode on the video frame and rotate the barcode based on user defined local settings, a remote status associated with the client device, a remote smart contract escrow status, and so forth.

The client device 104 may provide video feed 114 with the embedded barcode to the video content provider 106. In an example embodiment, the video content provider may include one or more of live video distribution services 502, 504, 506. The live video distribution services may include Twitch™, Google™, Facebook™, and so forth.

The client device 104 may also send a reference 508 to the system 200. The reference 508 may include a link to a video consumption site associated with the video content provider. In an example embodiment, the client device 104 may send the reference 508 at some intervals to instruct the system 200 to capture the video feed. The system 200 may consider the receipt of the reference 508 to be an instruction for the system 200 to check video feed signal from the video content provider 106.

Based on the receipt of the reference 508, the system 200 may create a recording layer at step 512. The recording layer may be created for storing data associated with the video feed 114, such as the video, frames of the video feed also referred to herein as video frames, and other data associated with the video feed.

The system 200 may consume live video at step 514. The live video may include the video feed 114 streamed by the video content provider 106. The system 200 may read video frames of the consumed live video at step 516.

At step 518, the system 200 may analyze the video frames to determine whether the video frames have an image. If the image is detected, the system 200 may read a QR code from the image at step 520. Upon reading the QR code, the system 200 may fetch an action associated with the QR code from a database at step 522. Specifically, the system 200 may access the database and match an identifier contained in the QR code with identifiers stored in the database. Upon finding the match, the system 200 may determine a category associated with the QR code at step 524. Based on the determined category, the system 200 may ascertain an execution case associated with the category and execute the execution case at step 526. Additionally, the system 200 may track results and/or status of execution of the execution case at step 528. At step 530, the system 200 may provide a report to the client device 106 and record data related to the execution of the execution case to the database.

If the system 200 determines, at step 518, that no image is present in the video frames, the system 200 may initiate error handling at step 532. In an example embodiment, the error handling may include capturing further one or more frames of the video feed 114 to detect the image, informing the client device 104 that no image is present in the video feed 114, and the like.

The system 200 may be used in the following example embodiments of implementation: a combination of a live video feed, a blockchain, and a payment for advertisements; breaking long video feeds with multiple segments into smaller video portions based on the segments, remote coding or neural network training via barcodes to detect various items within video streams including both live video streams and web-based videos, live event recording with segmentation and distribution of the video feed, kiosk mode event recording with segmentation and distribution of the video feed, and so forth. Some example embodiments of implementation of the system 200 are described below.

Example 1—Batch Uploading and Segmenting

A plurality of users may have video files with embedded images. The images may include barcodes, watermarks, or any other visual elements embedded by the user in the video. A user may upload the video files from a local location (e.g., a client device associated with the user) to a given endpoint associated with a video content provider. The image embedded into the video may be intended for the categorization of the video. The system 200 may capture the video frames and scan the video frames to find the image embedded into the video frames. Based on the image, the system 200 may search the database to determine the category associated with the image. Based on the category, the system 200 may determine the execution case. Specifically, the system 200 may determine that the video files are associated with a group ID. Therefore, the execution case may need to be performed with respect to the plurality of video files. In an example embodiment, the action associated with the execution case may include cutting the content of the video files into sequences or combining the video files. This embodiment may be applicable, for example, for a kiosk-type computer, which can be setup at an event, such as a photo/video booth at a wedding. Also, this embodiment may be used for eSports tournaments, such as video game tournaments, when the execution case may be collectively applied to video files received from a number of players.

Example 2—Live Video Challenge

A plurality of users may stream a video content related to a challenge. The challenge may include, for example, a personal challenge, a charity challenge, and the like. Specifically, the challenge may include performing a particular action, recording a video showing performance of the particular action by the user, and streaming the video to a web site, a social network, a network platform, a cloud storage, and the like. The user may use a software running on a client device, such a video mixer, to embed a barcode in the video. The users may provide the video feed to the video content provider. Furthermore, the users may send a reference to the system 200. The reference may include an instruction to capture the video feed from the video content provider.

In an example embodiment, the users may provide the video without embedded barcodes to the video content provider. The video content provider may be responsible for embedding the barcodes to the video feed received from the plurality of users. The video content provider may embed the barcodes based on metadata associated with the video feed received from the users. The metadata may include key words selected by the users for the video feed, a location, a time, user data, user preferences, and the like. In an example embodiment, the reference instructing the system 200 to capture the video feed may be sent to the system 200 by the video content provider.

The system 200 may capture the video feed from the video content provider. When recording of the video feed is started by the system 200, the system 200 may send a notification to the video content provider informing that the system 200 has started capturing of the video feed. Upon receipt of the notification, the video content provider may remove the barcode from the video feed because the barcode is already captured by the system 200 in one or more frames of the video, and the barcode on further frames of the video is needed for the system 200.

Furthermore, the video may be recorded with a frame rate of, for example, 24 frames per seconds (fps). The barcode may be embedded into only several frames of the video feed. Therefore, the user that watches the video feed may probably not notice the barcode embedded only in several frames of the 24 fps video feed. In a further example embodiment, the embedded barcode may be intended to be read by a computer vision software and may not be intended to be visually seen by viewers.

In an example embodiment, the system 200 may send the notification informing that the system 200 has started capturing of the video feed to the client device associated with the user. In this case, the video mixer of the client device may stop embedding barcodes into the video feed.

This bidirectional communication between the system 200, the client devices, and the video content provider may help to change the contents of the video feed streamed by the video content provider by removing the barcode from the video feed in real time.

The system 200 may capture the video feed, derive one or more frames of the video feed, detect the barcode, and execute an execution case associated with the barcode. The execution case may include uploading the video feeds containing the barcode to a particular web site, tagging the video feeds, adding key words to the description of the video feed, transferring a payment amount from a payment associated with the user that provided the video feed to a payment account of a charity organization, and the like.

Example 3—Not Live Video Challenge

A plurality of users may upload videos to a web site associated with a video content provider. The video content provider may embed a barcode into a first frame of each of the uploaded videos. The video content provider may notify the system 200 that new video content is available. In an example embodiment, the video content provider may use webhooks to notify the system 200. Using webhooks may include the video content provider notifying a party (e.g., the system 200) upon occurrence of a particular event (e.g., receipt of the videos by the video content provider from the users).

In an example embodiment, the system 200 may be informed about new videos by the users. For example, the users may use the client devices to send a notification to the system 200 to inform that the users uploaded the video content to a web site associated with the video content provider.

In a further example embodiment, the system 200 may periodically access the video content provider to check whether any new videos associated with one or more users are uploaded to the video content provider. The system 200 may perform this checking based on user data that may be previously received by the system 200 from the user. Furthermore, the user may provide an instruction to the system 200 to periodically check presence of new videos on the web site associated with the video content provider.

Example 4—Detection of a Barcode and Injection of an Image into a Video

A plurality of users may stream video content to a video content provider. The users may embed a barcode into several frames of the video feed. The system 200 may be notified about the video feed. The system 200 may create a record in the database and initiate recording of the video feed. The system 200 may extract the barcode from the frames, categorize the barcode based on data stored in the database, and determine that the execution case to be performed includes adding a predetermined image to the video stream. Upon determination of the execution case, the system 200 may inject the predetermined image to the video content of the users streamed by the video content provider. The predetermined image may be stored in the database or provided to the system 200 by the user.

Example 5—Cutting and Combining Video Feeds

A plurality of users may provide video content to a video content provider. The video content may be associated with the same event (for example, a tournament in which each of the users takes part). The users may embed a barcode into several frames of the video feed. The system 200 may be notified about the video feed. The system 200 may create a record in the database and initiate recording of the video feed. After the system 200 starts capturing the video, the barcode may not be added to further frames of the video by the user.

The system 200 may extract the barcode from the frames, categorize the barcode based on data stored in the database, and determine the execution case that is required to be performed. The execution case may include combining video feeds having the same barcode into a single video feed or several feeds, in accordance with the category. Therefore, the system 200 may aggregate video files provided by multiple users and having the same category. In an example embodiment, the system 200 may distribute the aggregated video feed across multiple users or multiple web sites according to an instruction associated with the execution case determined based on the category.

Example 6—Live Event Check-In

A plurality of users may take part in a live eSports tournament with a head-to-head play. Client devices may include one or more kiosk stations. The plurality of users may check-in at kiosk stations for matches using a badge. The kiosk stations may store the check-in data of the users. When the match play begins, a barcode may be injected into a video feed associated with the match play. The system 200 may be notified about the video feed. The system 200 may start recording of the video feed, detect barcodes in the video feed, and determine a category associated with the barcodes. Based on the category, the system 200 may determine an execution case. The execution case may include combining the video feeds having the same barcode into a single video feed or into several video feeds. In an example embodiment, the system 200 may distribute the aggregated video feed across client devices of multiple users or multiple web sites.

Example 7—Online Live Event Check-In

A plurality of users may take part in an online eSports tournament. The plurality of users may check-in at local computers associated with the users. The local computers may provide data related to the check-in of the users to a content provider associated with the online eSports tournament. When the match play begins, a barcode may be injected into the video stream associated with the online eSports tournament. The system 200 may be notified about the video feed. The system 200 may start recording of the video feed, detect the barcodes in the video feed, and determine a category associated with the barcodes. Based on the category, the system 200 may determine an execution case, such as combining the video feeds having the same barcode into a single video feed or into several video feeds, distributing the aggregated video feed across multiple web sites, and the like.

Example 8—Live Advertisements

A user may provide a video stream using a video content provider. A video mixer running on the client device of the user may embed a barcode into the video stream. The system 200 may start recording of the video feed, detect the barcode in the video feed, and determine a category associated with the barcode. Additionally, the system 200 may determine a number of live views of the video feed by viewers. The number of live views may be determined using an API associated with the video content provider. Based on the determination of the number of live views, the system 200 may perform payment to the user under a smart contract on a blockchain.

Example 9—A Smart Contract

Upon determining the category and the execution case, the system 200 may record data related to the category to a smart contract. For example, the system 200 may record a link to a web site where the video is streamed into a smart contract data structure associated with Ethereum. Ethereum is a distributed computing platform that runs smart contracts, i.e., computer programs that facilitate performance of contracts using blockchain technology Users may access a user interface associated with the system and create escrow contacts and smart contracts associated with the blockchain. Each of the escrow contacts and smart contracts may be assigned with a category. Therefore, to execute the escrow contact or the smart contract, the user may encode the category associated with the escrow contact or the smart contract into the barcode. The execution of the escrow contact or the smart contracts may include, for example, paying a revenue to the user for a number of viewers of the video feed of the user. The revenue may be paid by an advertiser when the escrow contact or the smart contract is executed. The advertiser may provide advertisements to be shown in the video feed when the video feed is shown to the plurality of users. The escrow contact or the smart contract may include data associated with the advertiser.

Example 10—Categorized Feed Consumption

The system 200 may determine that the category of the barcode contained in the video feed relates to blockchain technology. Based on this determination, the system 200 may provide the video feed to the users in a particular way. For example, the system 200 may stream the video feed in a video player predetermined for particular events or challenges.

Example 11—Declaring an Intent

The user may embed the barcode to the video feed. The barcode may be associated with an execution case that must be executed by the system 200 in future. For example, the user may encode, into the barcode, an instruction to delete the video feed and metadata associated with the video feed after a predetermined period. The system 200 may decode the barcode, determine the category associated with the barcode, look up the database to determine the execution case associated with the category, and perform the execution case after the predetermined period.

Example 12—A Smart Contract

The user may associate the video feed with a smart contract. The smart contract may include preferences set by the user for management of the video feed by the video content provider or any other third party. For example, the user may encode a category associated with the smart contract into a barcode embedded into the video feed. The category may be associated with execution cases related to management of rights related to the video feed, revenue from advertisements shown in the video feed, allowing distribution of the video at third-party web sites, and the like. Therefore, by creating smart contracts and embedding the category related to the smart contracts into the video feed, the user may control the usage of the video feed by third parties.

Example 13—Upload of a URL to a Video Content Provider

A user may have unique terms of service, usage, or rights as to how the video of the user may be used. The metrics related to terms of service, usage, or rights may be determined by the video content provider and may be queried by the system 200 from the video content provider using blockchain references. The user may provide data related to the video feed to the video content provider. The data may include a number of days the video must be visible on a video platform, information on whether the video feed is a social challenge, information on whether this video must be aggregated with other video feeds, and the like.

Example 14—Upload to a Video Content Provider

The user may embed data related to a number of days the video must be visible on a platform, information on whether the video feed is a social challenge, information on whether this video must be aggregated with other video feeds, and the like directly into the video feed using a video production software running on the client device. The video content provider may receive the video feed form the user and detect the barcodes associated with the video feed. Upon consumption of the video feed, the video content provider may display the video feed with the embedded barcodes to an end user. Moreover, the video content provider may ensure that the streaming of the video complies with the requirements set by the user in the barcodes.

Example 15—an Autonomous Execution Case

The execution case associated with the category embedded into the barcode may include an action to be performed by the system 200 in relation to the content of the video. The action may include, for example, detecting all items of a particular type in the video feed (e.g., bicycles), counting the occurrences of the items, or detecting when the items began or stopped occurring in the video feed. The detection of the items may be performed using neural network algorithms.

Example 16—A Data Reference Encoding a Method of Distributed Code/Logic/Data

The video feed may contain a plurality of barcodes. The barcodes may be encoded using a Secure Hash Algorithm (SHA)-256. The barcodes may encode unique web data references. Each data reference may be associated with a downloadable data reference having a size of 1 gigabyte. Each video frame may contain 84 barcodes. Each second of the video may contain 60 video frames and may convey about 5 terabytes of data in a video clip having a size of about 20 megabytes. The barcodes may be used to pass large execution logic or patterns into video stream transformation logic. Specifically, a neural net computer vision model may be passed via a remote location reference in the barcode to detect specific objects or actions directly within the video stream.

Example 17—Embedding Execution Logic to Transform a Video Feed

The barcode may be used to embed execution logic in the video stream. The execution logic may include actions to be performed in respect of the video feed, such as creating a Graphics Interchange Format item based on the video feed, transcoding the video feed into MP4 format, and so forth.

Example 18—Transformation of a Live Video Content Via Bidirectional Communication A desktop application associated with the system 200 may be running on a client device. The desktop application and a video content provider may communicate using a bidirectional communication. The bidirectional communication may be used to transform the live video stream in real time.

Figure 6:
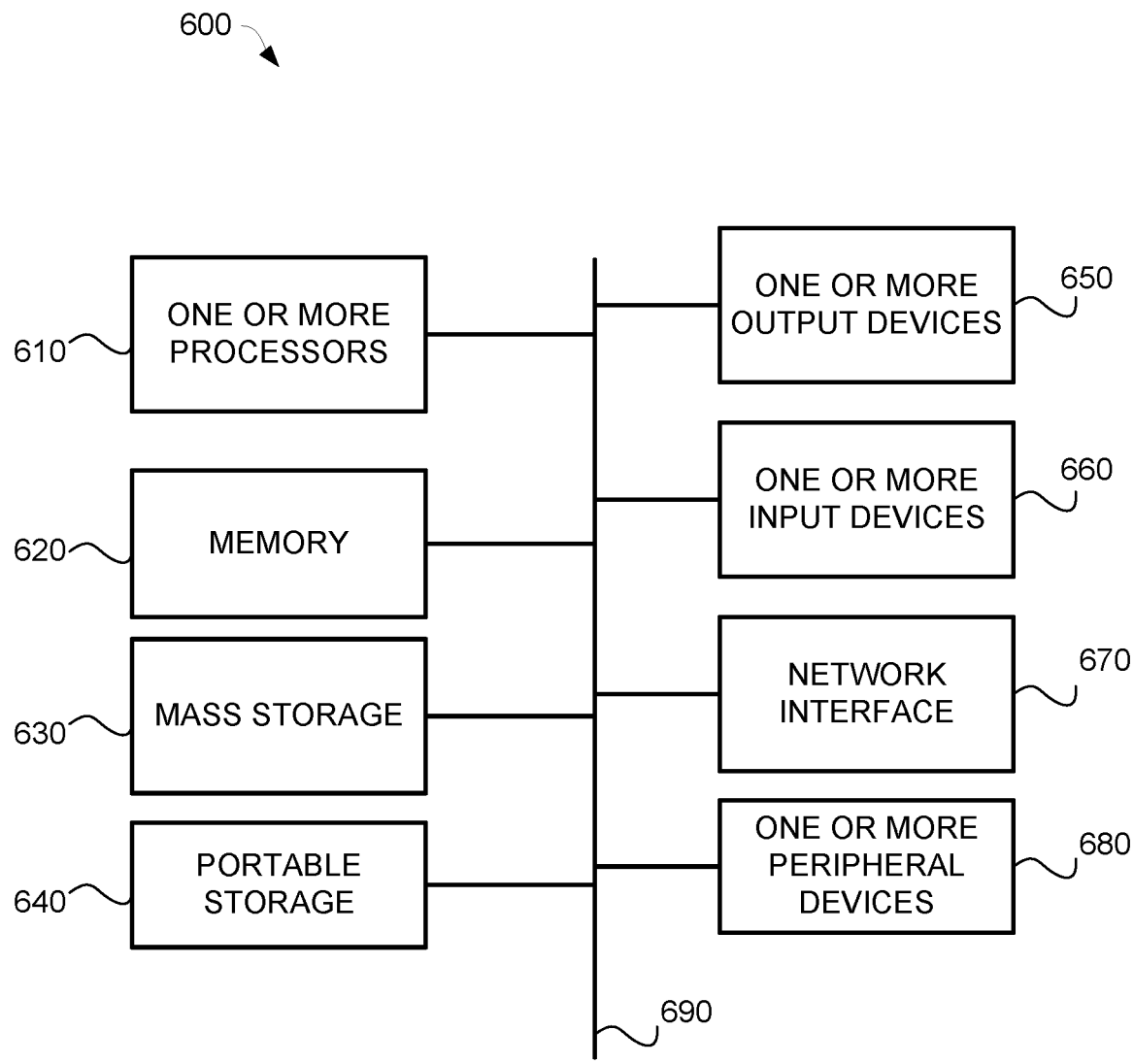
FIG. 6 shows a computing system that can be used to implement a method for executing a case based on a barcode detected in a video feed, according to an example embodiment.

FIG. 6 illustrates an exemplary computing system 600 that may be used to implement embodiments described herein. The exemplary computing system 600 of FIG. 6 may include one or more processors 610 and memory 620. Memory 620 may store, in part, instructions and data for execution by the one or more processors 610. Memory 620 can store the executable code when the exemplary computing system 600 is in operation. The exemplary computing system 600 of FIG. 6 may further include a mass storage 630, portable storage 640, one or more output devices 650, one or more input devices 660, a network interface 670, and one or more peripheral devices 680.

The components shown in FIG. 6 are depicted as being connected via a single bus 690. The components may be connected through one or more data transport means. The one or more processors 610 and memory 620 may be connected via a local microprocessor bus, and the mass storage 630, one or more peripheral devices 680, portable storage 640, and network interface 670 may be connected via one or more input/output buses.

Mass storage 630, which may be implemented with a magnetic disk drive or an optical disk drive, is a non-volatile storage device for storing data and instructions for use by a magnetic disk or an optical disk drive, which in turn may be used by one or more processors 610. Mass storage 630 can store the system software for implementing embodiments described herein for purposes of loading that software into memory 620.

Portable storage 640 may operate in conjunction with a portable non-volatile storage medium, such as a compact disk (CD) or digital video disc (DVD), to input and output data and code to and from the computing system 600 of FIG. 6. The system software for implementing embodiments described herein may be stored on such a portable medium and input to the computing system 600 via the portable storage 640.

One or more input devices 660 provide a portion of a user interface. The one or more input devices 660 may include an alphanumeric keypad, such as a keyboard, for inputting alphanumeric and other information, or a pointing device, such as a mouse, a trackball, a stylus, or cursor direction keys. Additionally, the computing system 600 as shown in FIG. 6 includes one or more output devices 650. Suitable one or more output devices 650 include speakers, printers, network interfaces, and monitors.

Network interface 670 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 670 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 680 may include any type of computer support device to add additional functionality to the computing system. The one or more peripheral devices 680 may include a modem or a router.

The components contained in the exemplary computing system 600 of FIG. 6 are those typically found in computing systems that may be suitable for use with embodiments described herein and are intended to represent a broad category of such computer components that are well known in the art. Thus, the exemplary computing system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, systems and methods for executing a case based on a barcode detected in a video feed are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for executing a case based on a barcode detected in a video feed, the system comprising:
a processor configured to:
receive the video feed from a video content provider, the video feed being provided by a client;
receive, from the client, a reference to a video consumption site associated with the video content provider;
extract at least one video frame from the video feed;
detect a barcode embedded in the at least one video frame;
analyze the barcode to determine a category associated with the at least one video frame;
ascertain an execution case associated with the category;
receive, from the client, an intended category associated with the at least one video frame;
compare the intended category to the category determined based on the barcode; and
based on the determination that the intended category matches the category determined based on the barcode, selectively execute the execution case with respect to the video feed, wherein the executing of the execution case includes executing a smart contract; and
a database communicatively coupled to the processor, the database storing instructions executable by the processor.

2. The system of claim 1, wherein the execution case includes one or more of the following actions: transforming a video, distributing a video, verifying video contents, executing a smart contract, creating an alternate video format, verifying a contract right, verifying an activity, describing video feed metadata, generating a record, initiating a recording, displaying an image, injecting an image into the video feed, displaying an advertisement, rotating an advertisement banner, calculating an advertisement revenue, performing a special effect, collecting data associated with the video feed, and removing the barcode from the at least one video frame.

3. The system of claim 1, wherein the determining of the category includes:
extracting an identifier from the barcode; and
looking up the category in a database based on the identifier.

4. The system of claim 1, wherein the client includes at least one of the following: a mobile client, a desktop client, and a web service.

5. The system of claim 1, wherein the barcode includes a Quick Response (QR) code.

6. The system of claim 1, wherein the video content provider includes a livestream provider.

7. The system of claim 1, wherein the processor is further configured to:
determine that the barcode includes a group Identification (ID); and
based on the determination, execute the execution case with respect to at least one further video feed associated with the group ID.

8. The system of claim 7, wherein the executing of the execution case includes aggregating the video feed with at least one further video feed associated with the group ID.

9. The system of claim 7, wherein the executing of the execution case includes:
determining a number of viewers for the video feed based on the group ID associated with the client and by using an application programming interface (API) associated with the video content provider; and
based on the determination that the number of viewers exceeds a predetermined payout threshold, execute a smart payment contract.

* * * * *